Nov. 30, 1937.  W. S. BOGGS  2,100,535

MOVING PICTURE MACHINE

Original Filed April 19, 1934

INVENTOR.
WILBER S. BOGGS

ATTORNEY.

Patented Nov. 30, 1937

2,100,535

UNITED STATES PATENT OFFICE 2,100,535

MOVING PICTURE MACHINE

Wilber Smith Boggs, Las Animas, Colo.

Refiled for abandoned application Serial No. 721,348, April 19, 1934. This application July 6, 1936, Serial No. 89,113

7 Claims. (Cl. 271—2.3)

This invention relates to improvements in moving picture machine mechanism and has reference more particularly to an improved roller for use in the projection of moving pictures employing films provided with sound tracks.

This is a refile for abandoned application No. 721,348, filed April 19, 1934.

In one system of sound reproduction, that is extensively employed in connection with moving pictures, the sound is recorded by means of light on a film and the so called "sound track" extends parallel with the edges of the film and along the inside of one line of sprocket openings.

The sound track is very sensitive and if the film is scratched ever so little, it will injure the sound effects, because the scratches will permit light to enter at points where it should not pass through the film, and this will cause objectionable disturbances.

In moving picture machines the mechanism employed for moving the film past the light opening comprises a roller having sprocket teeth at each end which engage in the sprocket openings of the film for the purpose of producing a positive film feed. In order to hold the film against the outside of the sprocket roller and to prevent it from slipping from the sprocket teeth, an idler roller is provided to engage the outer surface of the film and urge it toward the sprocket roller, by means of springs or other means, and this idler roller is normally provided with a pair of spaced flanges near each end.

The flanges are so located that the sprocket teeth will enter the space between the flanges and all of the flanges will contact with the surface of the film. When ordinary silent films are employed, the flanges of the idler roller will not do any particular harm because the minute scratches that it may cause do not objectionably effect the picture on the screen. Films having sound tracks are made in such a way that the sound track is, as a rule, located on the inside of one row of sprocket openings and thus it comes directly underneath one flange of the idler roller and it has been found that the contact with the flange of this roller produces scratches in the surface of the film.

This invention, briefly described, consists in modifying the idler roller by either removing entirely the flange that normally comes over the sound track, or by reducing its diameter slightly below that of the other flanges so that during normal operation, it will not contact with the surface of the film and therefore will not injure the sound track.

Having thus briefly described the invention the same will now be described in detail, and for this purpose, reference will be had to the accompanying drawing in which the preferred embodiment of the invention has been illustrated, and in which.

Figure 3:
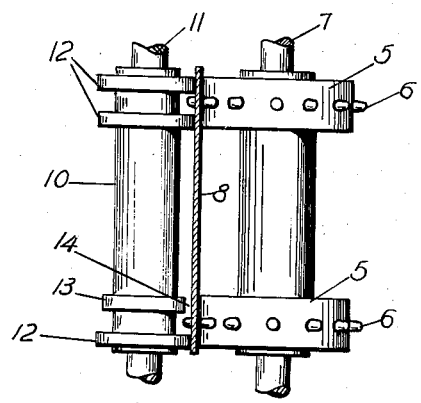
Figure 3 is a section taken on line 3—3, Figure 1.

In the drawing reference numeral 5 designates a sprocket roller which is provided adjacent each end with a row 6 of sprocket teeth. The center of this roller is usually cut away as shown in Figure 3 so as to make it of spool shape, although such rollers are sometimes made in the form of a cylinder. The sprocket roller is mounted on a shaft 7. The film has been indicated by reference numeral 8 and this is provided along its edges with rows of sprocket openings 9.

The openings are spaced so as to be engaged by the sprocket teeth 6, in the manner shown in the drawing. The idler roller, which has been designated by reference numeral 10, is mounted for rotation on a shaft 11, and is normally urged against the film by some suitable means.

A spring is usually employed for urging the idler roller toward the film, but this has not been shown for the reason that the apparatus, in the relationship shown in the drawing, is merely the old and well known apparatus employed for this purpose. The film is moved intermittently by means of a suitable mechanism and if the ordinary type of idler roller is used, the sound track becomes injured, as above noted.

Figure 2:
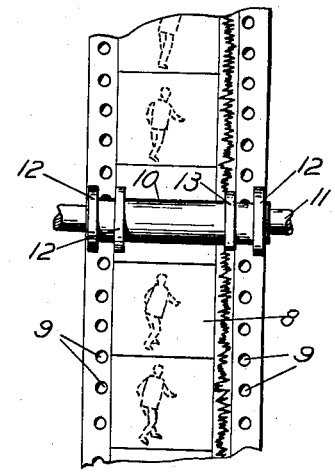
Figure 2 is a view looking in the direction of arrow 2, Figure 1.

The idler roller shown in Figures 2 and 3 is provided with two pairs of flanges 12, there being one pair near each end. These flanges are so located and spaced that the sprocket teeth 6 will extend into the space between the flanges of each pair. In the ordinary construction of idler roller, the four flanges are all of the same diameter and all contact with the film during operation. Owing to the intermittent motion of the film and to friction and other causes relative movement between the film and the peripheries of the flanges takes place at times with the result that the sound track becomes injured.

In the drawing the inside flange of one pair has been designated by reference 13 and this flange is the one that is located directly above the sound track. It will be seen from Figure 3 that the diameter of flange 13 is less than the diameter of the flanges 12 with the result that there is normally a space 14 between the periphery of flange 13 and the outside of the film.

The flange 12 which forms with flange 13 a pair, is always in contact with the film, whereas, flange 13 is not in contact therewith, except accidentally. It sometimes happens that during the operation of a moving picture machine, a section of the film having sprocket openings will be torn out and if flange 13 is dispensed with entirely, the edge of the film at the torn place may move to one side so as to interfere with the proper operation, whereas by having the flange 13 in close proximity to, but normally out of contact with the film, the latter will be guided past the torn place.

It is evident that if flange 13 does not contact with the surface of the film along the sound track it cannot scratch or injure the sound track and this has been found by experience to give a much longer life to a film than is normally obtained when the idler roller is constructed in the usual manner.

Figure 1:
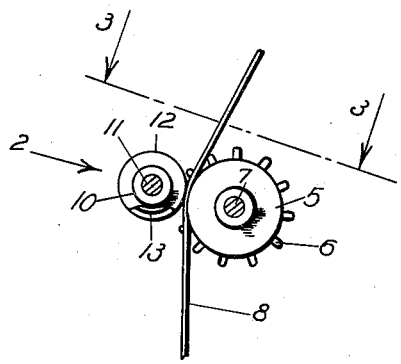
Figure 1 is a side elevation showing a sprocket roller, the film and the idler roller in the position that they occupy during operation.
Figure 4:
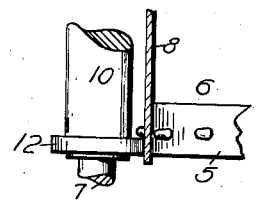
Figure 4 is a fragmentary view similar to that shown in Figure 3, and shows an idler roller having only three flanges.

In Figure 4 an idler roller has been shown in which the flange 13 has been removed completely and with such an arrangement there is, of course, no danger of scratching the sound track due to its contact with a flange since the flange has been removed. But when flange 13 is omitted, there is a very slight danger of the film moving out of position when a portion of the edge containing sprocket openings has been torn and the arrangement shown in Figures 1, 2 and 3 is therefore considered to be preferable.

It will be seen from the above description that this invention involves only a very slight modification of the present form of idler roller, and the difference between the ordinary roller and the one that forms the subject of this invention consists in the smaller diameter of one of the flanges. The beneficial results of this slight modification is, however, of great importance to the film industry because, after having substituted rollers of the kind described above and illustrated on the drawing, a film can be used a great many more times than it could with the ordinary idler roller and its life is consequently lengthened which results in a great saving, in the aggregate, over what is now being accomplished.

Having described the invention, what is claimed as new is:—

1. An idler roller of the type employed in machines for exhibiting moving pictures by the use of a film having a sound track, said idler roller having a body provided with a plurality of spaced circular flanges for engaging the surface of the film, the flange located directly over the sound track being of smaller diameter than the other flanges whereby a space is provided between the smaller flange and the surface of the film corresponding to the sound track.

2. An idler roller of the type employed in machines for exhibiting moving pictures by the use of a film having a sound track, said idler roller having a substantially cylindrical body and a plurality of circular flanges for engaging the surface of the film, the surface of the flange located directly over the sound track being of smaller diameter than the other flanges, whereby a space is provided between the smaller flange and the surface of the film corresponding to the sound track.

3. An idler roller for use with mechanisms for handling moving picture films having sound tracks and which employ a sprocket roller having a row of sprocket teeth near each end, the idler roller having a pair of spaced flanges of equal diameters, near one end, positioned to receive between them the corresponding row of sprocket teeth of the sprocket roller, the other end of the idler roller having a flange of the same diameter as the other two and located on the opposite side of the corresponding row of sprocket teeth from that on which the sound track is located.

4. An idler roller for use with mechanisms for handling moving picture films having sound tracks and which employ a sprocket roller having a row of sprocket teeth near each end, the idler roller having a pair of spaced flanges near each end, each pair of flanges being so positioned that they will receive between them a row of sprocket teeth, the flange that would normally contact with the film surface at the sound track being of less diameter than the others whereby the sound track will not be injured thereby during operation.

5. In an apparatus for the projection of motion pictures with sound, an idler roller having two pairs of flanges projecting radially from the roller to hold a film in contact with a film-driving roller, one of the said flanges being of lesser diameter than others to normally clear the sound-track of the film.

6. In an apparatus for the projection of motion pictures with sound, an idler roller having a radially-projecting flange in alinement with the sound-track, and another flange of larger diameter on the roller at either side of the first said flange and adapted to normally hold the first said flange away from contact with the sound-track, all flanges cooperatively serving to retain the film in engaging relation with a film-driving roller.

7. In a device for projecting motion pictures with sound, inclusive of a film-driving roller having film-engaging gear-teeth, an idler roller cooperative with the driving roller and having flanges for engaging a film running between the rollers, at opposite sides of the driving teeth, and a third flange engaging the film between rows of teeth, the flanges simultaneously engaging the film away from the pictures thereon, to the exclusion of all other parts of the idler.

WILBER SMITH BOGGS.